UNITED STATES PATENT OFFICE.

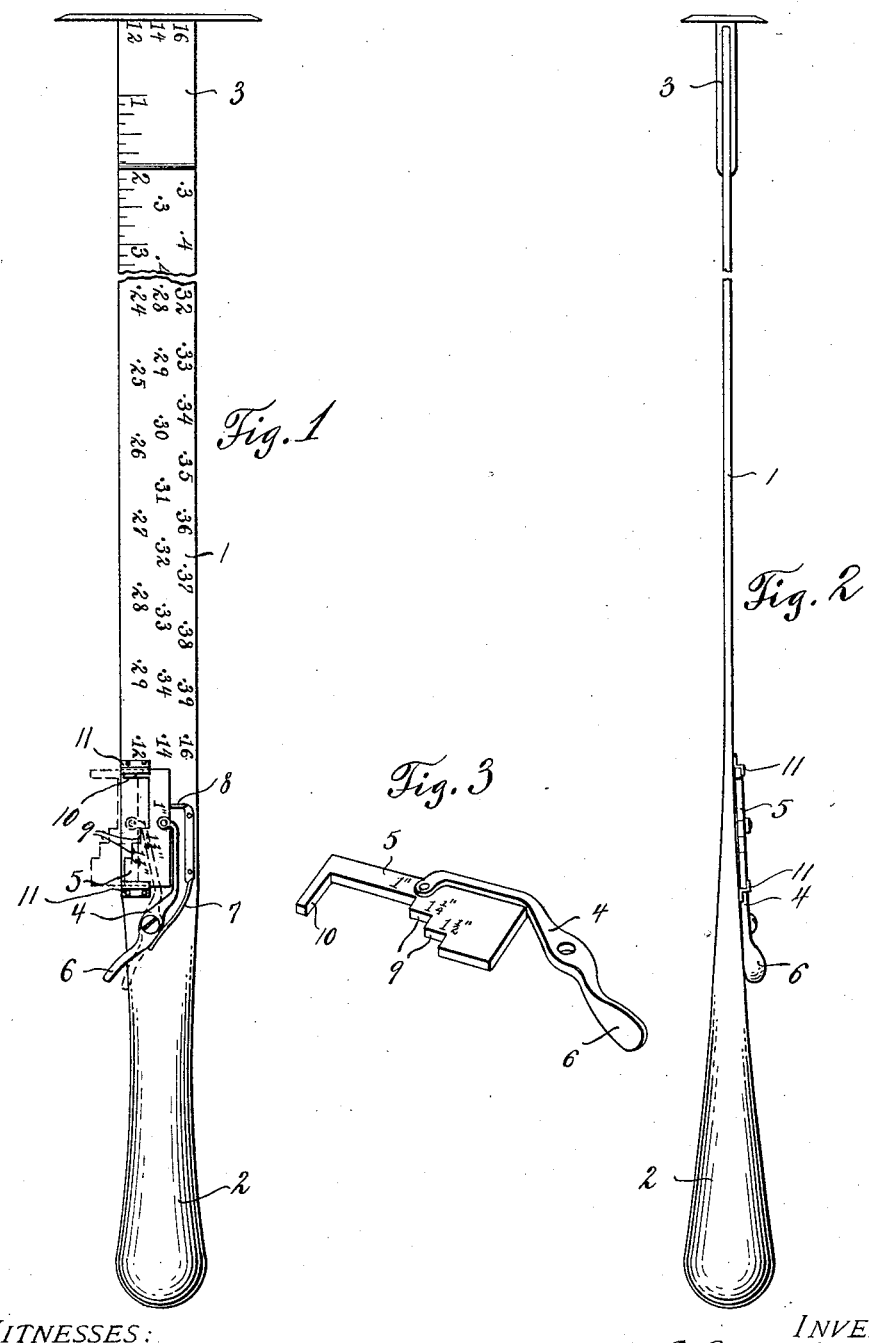

PRINCE M. ANDERSON, OF MEMPHIS, TENNESSEE.

DIMENSION-GAGE.

999,141.  Specification of Letters Patent.  Patented July 25, 1911.

Application filed January 27, 1911. Serial No. 605,083.

*To all whom it may concern:*

Be it known that I, PRINCE M. ANDERSON, a citizen of the United States, residing at Memphis, in the county of Shelby and State of Tennessee, have invented certain new and useful Improvements in Dimension-Gages, of which the following is a specification.

This invention is primarily designed to provide a dimension gage which may be easily applied to a measuring stick or rule, and in such a manner that the former will be out of the way when not in use.

A further object of this invention is to mount the gage so that the same may be placed in operative and inoperative positions, as will be hereinafter more fully described.

With the above and other objects in view, this invention consists in the construction, combination, and arrangement of parts, all as hereinafter more fully described, claimed, and illustrated in the accompanying drawings, wherein Figure 1 is a side elevation of a lumber rule, illustrating the gage mounted thereon; Fig. 2 is a bottom plan view thereof; Fig. 3 is a perspective of the gage.

Throughout the following description and on the several figures of the drawings, similar parts are referred to by like reference characters.

In constructing a device in accordance with the present invention, an ordinary measuring stick or lumber rule 1 is provided having the handle 2 on one extremity thereof and a positioning member or stop 3 on its opposite terminal.

Mounted on the rule adjacent to the handle is the gage which comprises a lever 4 provided with an aperture whereby the same may be detachably secured by a screw or other suitable means and a gage 5 carried by one terminal of the lever or operating member 4. The opposite terminal of the lever 4 is provided with a thumb piece which, in its normal position, projects beyond the edge of the rule, as illustrated in Fig. 1. A leaf spring 7 is secured to the rule and is adapted to bear upon the lever 4 adjacent to the thumb piece 6, thereby retaining the gage normally in an inoperative position and projecting the thumb piece into an operative position, as illustrated in Fig. 1. A stop 8 is formed integrally on the opposite terminal of the spring 7 to limit the movement of the gage 5. The gage 5 is of the usual construction, having the steps or shoulders 9, representing determined distances from the single shoulder or projection 10 carried on the opposite terminal of the gage.

From the foregoing, it will be obvious that to use the present invention to gage the thickness of lumber or for other useful purposes, it will be only necessary to depress the thumb piece 6, thereby projecting the gage 5 into an operative position, as illustrated in the dotted outline of Fig. 1. Upon releasing the thumb piece or depression member, the spring member 7 will withdraw the gage from its operative position to its inoperative position, the stop 8 limiting the movement of said gage whereby the latter is retained out of the way, and thus making the device of a desirable character in not hindering the full use of the rule.

A pair of guides 11 are mounted on the side of the rule 1 and are adapted to guide the gage 5, the pivotal connection of the lever 4 with the gage 5 permitting the sliding of the latter in said guides, as will be obvious from the drawing.

Having thus fully described my invention, what is claimed as new is:—

1. A dimension gage comprising a lumber rule, a gage slidably mounted thereon, spring means carried by said rule adapted to retain said gage in an inoperative position, means for limiting the movement of said gage, and a depression member pivotally mounted on said rule and adapted to move said gage into an operative position, as set forth.

2. In a dimension gage, a body, a pair of guides mounted on said body, a gage plate slidably mounted in said guides, a lever pivoted to said body adapted to operate said plate, and a leaf spring secured to said body adapted to bear against said lever, for the purposes herein specified.

In testimony whereof I affix my signature in presence of two witnesses.

PRINCE M. ANDERSON.

Witnesses:
 W. H. TAYLOR,
 G. E. TAYLOR.

Copies of this patent may be obtained for five cents each, by addressing the "Commissioner of Patents, Washington, D. C."